United States Patent
Hodgson

[15] 3,643,444
[45] Feb. 22, 1972

[54] SURFACE STABILIZATION PROCESS
[72] Inventor: Stamford Hodgson, Penarth, Wales
[73] Assignee: BP Chemicals Limited, London, England
[22] Filed: Aug. 11, 1970
[21] Appl. No.: 63,016

[30] Foreign Application Priority Data
Aug. 20, 1969  Great Britain......................41,642/69

[52] U.S. Cl. ............................................................61/36 R
[51] Int. Cl..........................................................E02d 3/14
[58] Field of Search ....................61/36 R; 166/295; 117/5.2, 117/161, 163

[56] References Cited

UNITED STATES PATENTS 3,061,569  10/1962  Stoner et al.............................61/36 R
3,123,158  3/1964   Gallus................................166/295 X
3,268,002  8/1966   Fischer...............................166/295 X
3,286,475  11/1966  Adams....................................61/36 R
3,437,625  4/1969   Bonnel et al........................166/295 X
3,503,774  3/1970   Weymouth..............................61/36 R

OTHER PUBLICATIONS

The Condensed Chemical Dictionary, Sixth Edition, Reinhold Publishing Co., New York 1961, page 920.

Primary Examiner—Stephen J. Novosad
Attorney—Jacobs & Jacobs

[57]  ABSTRACT

Ground surfaces such as oil storage bund areas are protected from seepage of hydrocarbon liquids by coating the surface with a plasticized polyvinyl acetate latex prepared in the presence of a partially hydrolyzed polyvinyl acetate homopolymer. In a prepared aspect, excessive layers of finely divided mineral materials bound together with latex are put down, and the whole sealed by a surface dressing of latex.

8 Claims, No Drawings

SURFACE STABILIZATION PROCESS

The present invention relates to a process for the treatment of ground surfaces to render them impervious to hydrocarbon liquids and ground surfaces when so treated.

It is common practice for reasons of safety in the oil industry to erect storage tanks for various hydrocarbon liquids in areas known as bunds. These are basinlike areas surrounded by dykes, capable of containing within the bund the total liquid content of the tanks and any tidal wave caused by its escape and thereby localizing the harmful effect of any damage to the tanks. Until recently, it has only been necessary for the bund to prevent any overflow of spillage in order to meet the various international safety regulations. However, it has now been found desirable and indeed necessary to meet new regulations, for the bund to prevent seepage of the hydrocarbon liquids into the earth on which the bund is located.

According to the present invention, a process for the treatment of ground surfaces to render them impervious to hydrocarbon liquids comprises sealing the surface with a plasticized polyvinyl acetate homopolymer latex, said polymer being prepared by emulsion polymerization in the presence of a partially hydrolyzed polyvinyl acetate homopolymer.

By liquid hydrocarbons are meant throughout this specification the crude hydrocarbon materials entering and the refined hydrocarbon products leaving oil refineries, which materials are liquids at normal temperatures and pressures. Typical examples of these are crude oil per se, straight run napthas, heavy gas oils, atmospheric residues and motor gasolines reformates, including the high aromatic content, e.g., around 65 percent, reformates.

Suitable polyvinyl acetate polymer latices for use in the process of the present invention are those prepared by the conventional emulsion polymerization techniques.

Suitable partially hydrolyzed polyvinyl acetates are those known in the art as emulsion stabilizers for polyvinyl acetate emulsion polymerization. Particularly preferred are the commercially available 60–98 percent hydrolyzed polyvinyl acetates.

Suitable concentrations of partially hydrolyzed polyvinyl acetate are in the range 2–10 percent by weight preferably around 5 percent by weight based on the weight of vinyl acetate monomer.

Suitable external plasticizers for the polyvinyl acetate latices are those well known in the art, for example dibutyl phthalate, dibutyl glycol phthalate, "Citroflex $A_4$" and dibutyl sebacate in concentrations up to 20 percent by weight based on weight of polymer. The choice of plasticizer and concentration will obviously depend to some extent on the climatic conditions of the area in which the process of the present invention is used, in order that the latex will form coherent films and seal the surface. For example, while 12–15 weight percent of plasticizer is a suitable amount for addition to the polyvinyl acetate homopolymer to enable it to form coherent films in temperate climates, less than 10 percent can be used successfully in hot climates, and in cold climates up to 20 weight percent will be needed, some of which is preferably a plasticizer which will impart low temperature flexibility to the film.

The polyvinyl acetate latex may be applied by any of the methods known for latex surface coating and is suitably used at 5–60 percent solids content.

In a preferred embodiment of the present invention, a layer or layers of fine mineral material, in combination with the latex as binder, are applied to the surface to be treated, and the whole sealed by a top dressing of the latex. It is preferred that successive layers from bottom to top have mineral materials of successively decreasing particle size, in order to produce a mechanically stable system.

The dilution of the latex and the relative proportions of latex to mineral material can be adjusted to give good binding of the mineral particles.

The process of the present invention is further illustrated with reference to the following example which illustrates the preparation of hydrocarbon liquid impervious surfaces.

EXAMPLE

The polymer used throughout this example was prepared by polymerizing vinyl acetate in the presence 5 weight percent based on monomer of an 88 percent hydrolyzed polyvinyl acetate; the latex was plasticized with 12 parts by weight of solids of dibutyl phthalate and 8 parts by weight of solids of "Citroflex $A_4$." It had a solids content of $\approx$ 55 percent.

To a base area of 1½-inch mean size loose rock in a small scale simulated bund area was applied a layer of ¾-inch aggregated to provide a level area. This was followed by a second layer of 1½-inch of a blend of ¾–¼-inch aggregate. This was then compacted. After compacting, it was then soaked by spraying with a latex diluted to 5 percent solids in an amount sufficient to penetrate to the 1½-inch bedrock. This formed a stable layer after 24 hours drying at ambient temperature (above 40° F.).

Aggregate dust was mixed with latex and water (1,400 grams dust, 1,816 grams latex at 55 percent solids, and 1,320 grams $H_2O$) to form a mix workable with a trowel, spread over the base area and surrounding bund walls to a depth of ¼-inch and allowed to dry for 48 hours at ambient temperature (above 40° F.). Then a 45 percent solids latex was sprayed over the whole area and allowed to dry. The last process was repeated.

After 7 days a 10 foot by 1 inch open ended glass column was sealed to the surface of test area with an epoxide cement and filled with a 65 percent aromatics gasoline reformate. After 1 month there was no drop in the level of the reformate in the tube indicating that the surface was impervious to the gasoline.

I claim:

1. A process for the treatment of ground surfaces to render them impervious to hydrocarbon liquids which comprises sealing the surface with a plasticized polyvinyl acetate homopolymer latex said polymer being prepared by emulsion polymerization in the presence of a partially hydrolyzed polyvinyl acetate homopolymer.

2. A process as claimed in claim 1 wherein the partially hydrolyzed polyvinyl acetate homopolymer is from 60 to 98 percent by weight hydrolyzed.

3. A process as claimed in claim 1 wherein the polyvinyl acetate homopolymer latex is prepared in the presence of 2–10 percent by weight based on the weight of vinyl acetate monomer of a partially hydrolyzed polyvinyl acetate homopolymer.

4. A process as claimed in claim 1 wherein the polyvinyl acetate homopolymer latex contains up to 20 percent by weight based on the weight of polymer of an external plasticizer.

5. A process as claimed in claim 1 wherein the polyvinyl acetate latex is used as a solids content between 5 and 60 percent.

6. A process as claimed in claim 1 wherein a layer or layers of finely divided mineral material, in combination with the polyvinyl acetate latex as binder, are applied to the surface to be treated and the whole sealed by a top dressing of the latex.

7. A process as claimed in claim 6 wherein successive layers from top to bottom have mineral materials of successively decreasing particle size.

8. A process as claimed in claim 1 wherein the surface to be treated is the surface of a bund storage area.

* * * * *